Nov. 2, 1926. 1,605,356
A. H. LEIPERT
METHOD OF MAKING UNIVERSAL JOINTS
Filed June 29, 1925
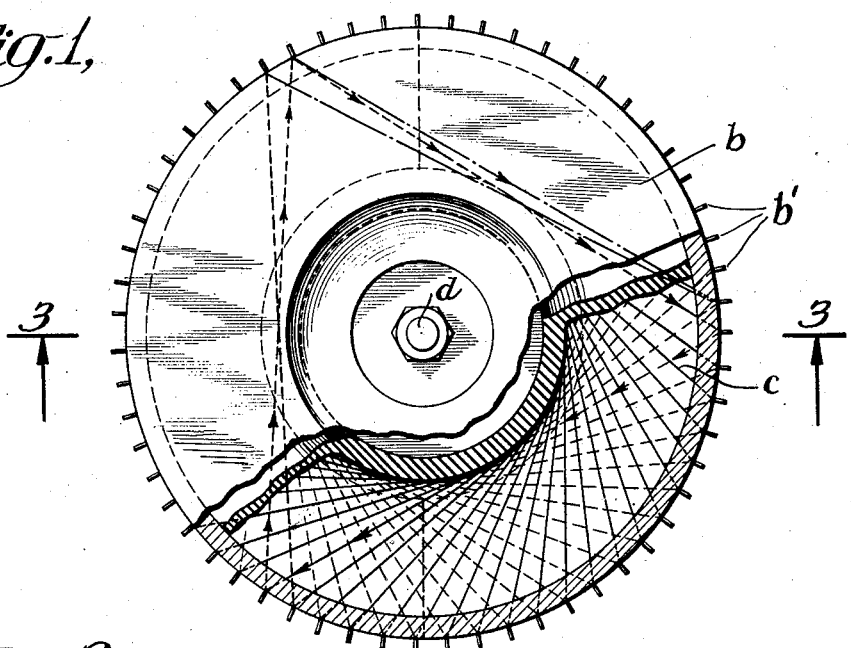
Fig.1,
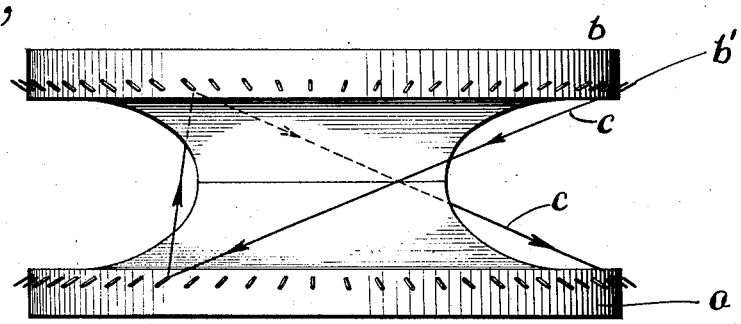
Fig.2,
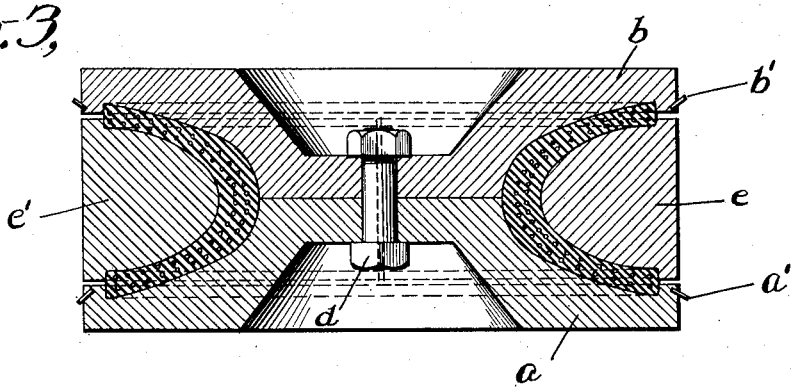
Fig.3,
Inventor
August H. Leipert.
By his Attorneys
Redding, Greeley, O'Shea & Campbell.

Patented Nov. 2, 1926.

1,605,356

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

METHOD OF MAKING UNIVERSAL JOINTS.

Application filed June 29, 1925. Serial No. 40,138.

In Letters Patent of the United States No. 1,414,411 granted May 2, 1922 there is disclosed a universal joint having straight cords which transmit the driving forces in either direction of rotation. These cords are carried in a suitable flexible casing. The present invention relates to the same type of universal joint that is concerned more particularly with a practical method of manufacturing the same.

It is the principal object of the present invention to provide manufacturing methods for laying up cords on a hyperboloid of revolution and mould them into a flexible casing such as rubber and vulcanizing the unit thus formed in accordance with such steps as will insure the provision of a joint of proper mechanical strength and flexibility and one which will transmit the driving forces in accordance with the principle disclosed in the aforementioned patent. The cords employed are wound within a mould so as to assume proper relative positions for transmission of the driving forces along straight lines and sheets of rubber are laid into the mould in such relation to the cords as to wholly embed them upon vulcanization. The rubber employed may itself be of different properties at different parts of the hyperboloid formed to take care of the different conditions to be met since, for instance, the greatest flexion is encountered at the center of the joint while the greatest mechanical stresses are imposed along the flanges formed for securing the joint to the driving and driven members. The properties of the rubber used are varied to facilitate the described actions.

Reference is now to be had to the accompanying drawings for an understanding of the improvements although it is to be understood that the drawings illustrate the devices employed only in schematic fashion and the invention is not to be limited to the precise form or design of those parts which best serve the purpose as known to a skilled rubber man. In the drawings:

Figure 1 is a view in plan, with parts broken away, of a mould for practicing the improved method and showing particularly the general course followed by the cross-cords.

Figure 2 is a view in side elevation of the mould shown in Figure 1.

Figure 3 is a view in transverse section taken on the plane indicated by the line 3—3 of Figure 1 and looking in the direction of the arrows and showing the complete mould and the relation of the rubber and cords, as during vulcanization.

A central mould member composed generally of upper and lower halves $b$, $a$, may have in cross section the hyperbolic form desired in the finished universal joint and the sections thereof may carry for convenience pegs $b'$, $a'$, so disposed with respect to one another that a continuous cord winding indicated as $c$ may be worked around the pegs and assume such tangential form with respect to the mould as to transmit, when in use, driving forces between the driving and driven members along straight lines in either direction of rotation. A bolt $d$ may be employed to secure the two mould members together. Exterior semi-circular mould members $e$, $e'$, serve to close the mould and hold the parts in proper relative position for vulcanization into a unitary structure, the interior cross sectional form of these members being such as is desired.

In the manufacture of a joint having continuous cord windings $c$ such as illustrated sheets of rubber may be laid into the mould before the winding is commenced and additional sheets may be laid in in any desired relation to the strands as may seem necessary to one skilled in the art until the desired mass of rubber is brought in and around the cords. The mould members $e$, $e'$, are then brought into place and vulcanization carried on. The finished product comprises a universal joint which may be coupled at its edges to driving and driven members for the purpose of transmitting driving forces therebetween in either direction of rotation along the straight cords $c$. The rubber permits flexing when the connected shafts assume relative angular positions. This flexing will in no case cause deflection of any of the straight cords $c$, considered lengthwise, since such flection will take place in the rubber along an axis coincident with one of such cords. If desired, the rubber laid in may have different properties at different points of the hyperboloid. For instance, the rubber near the edges where the joint is to be united mechanically with the driving and driven members may be tougher and harder while the rubber along the mid-section where flexion occurs may be more in the nature of soft gum rubber.

As pointed out hereinbefore, the invention is not to be limited to the character of the equipment actually employed during the manufacture or to the particular relation of elements since such matters will always follow the best practice in the rubber art but it is intended that the appended claims shall cover a manner of manufacturing universal joints of the character with which the invention is concerned which are made up in accordance with the general steps enumerated herein.

What I claim is:

1. The herein described method of manufacturing a universal joint of hyperbolic form which consists in laying in a mould of desired hyperbolic form, cords which extend along straight lines but intersect, respectively, at points adjacent the mid-section of the hyperboloid, laying into the mould a sufficient mass of rubber to completely embed the cords, closing the mould and vulcanizing the unit.

2. The herein described method of manufacturing a universal joint of hyperbolic cross sectional form which consists in laying in the mould cords extending, respectively, along straight lines but in different directions and intersecting adjacent the mid-section of the hyperboloid, laying in and around said cords a mass of rubber, closing the mould, and vulcanizing the unit.

This specification signed this 25 day of June A. D. 1925.

AUGUST H. LEIPERT.